April 11, 1967 C. S. MOGTADER 3,314,057

RANDOM ACCESS POSITIONING MEANS

Filed June 17, 1963 2 Sheets-Sheet 1

CHARLES S. MOGTADER
INVENTOR.
BY Samuel Lindenberg
Arthur Frelich
ATTORNEY

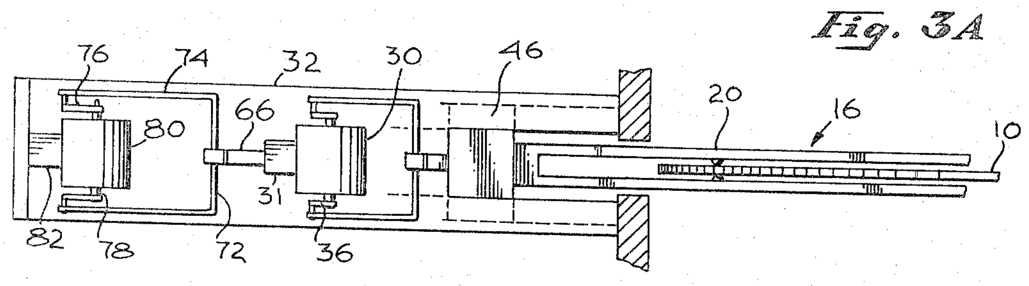
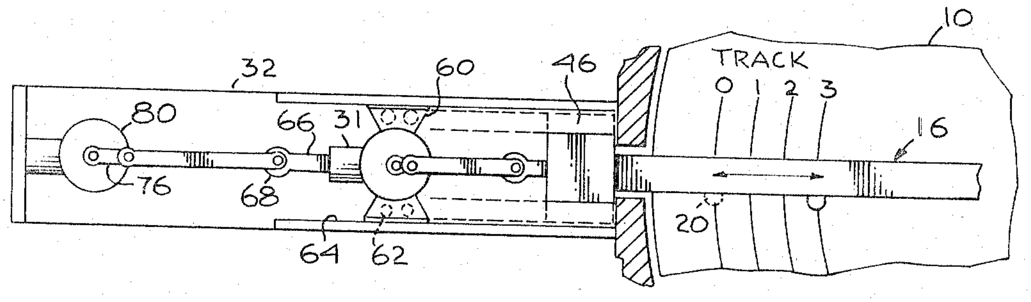
Fig. 3B
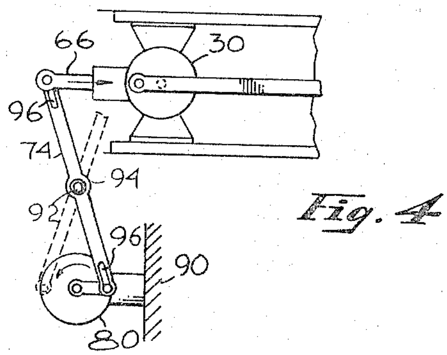
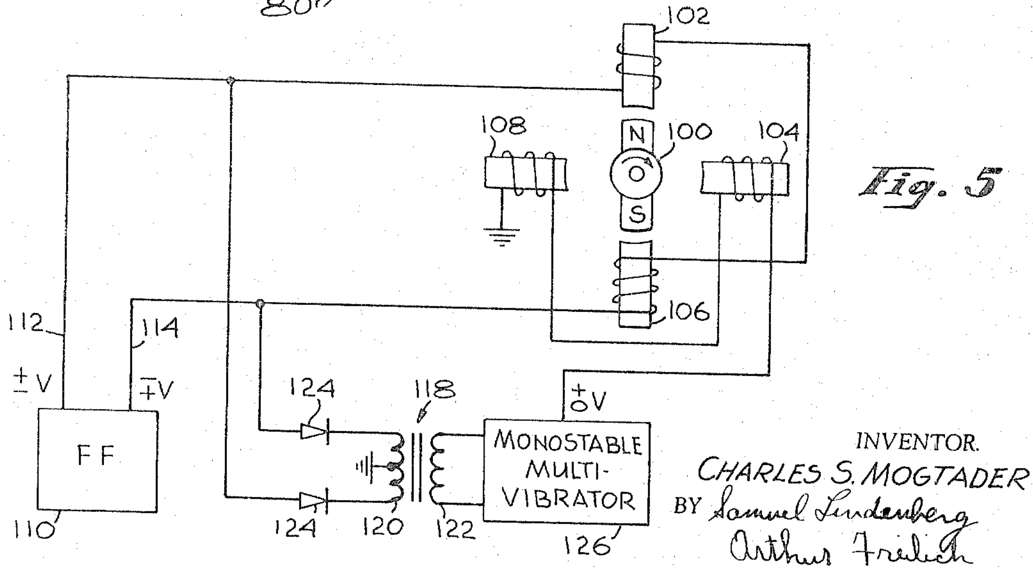
Fig. 5
INVENTOR.
CHARLES S. MOGTADER
BY
ATTORNEY

United States Patent Office 3,314,057

Patented Apr. 11, 1967

3,314,057

RANDOM ACCESS POSITIONING MEANS

Charles S. Mogtader, Beverly Hills, Calif., assignor to Data Products Corporation, Culver City, Calif., a corporation of Delaware Filed June 17, 1963, Ser. No. 288,197
9 Claims. (Cl. 340—174.1)

This invention relates generally to digital memory apparatus and more particularly to head positioning means for use in disc type digital memories.

Magnetic disc storage is becoming one of the more widely used digital data storage medias employed in data processing systems since it offers a speed of access advantage over magnetic tape storage and a higher storage density than magnetic drum storage.

The concept of magnetic disc storage is a natural evolutionary development from the concept of magnetic drum storage. Whereas data is stored on the peripheral surface of drums, data is stored on the opposed flat surfaces of discs. Accordingly, in the use of discs, tracks are defined as concentric rings on the flat surfaces thereof rather than as bands around the drum. Space is utilized much more efficiently in disc storage than drum storage inasmuch as a plurality of discs can be supported in superposed relationship with read and write heads adapted to extend between adjacent discs. Typically, 30 discs which are three feet in diameter with one inch being provided between discs, can store as much data as a three foot diameter drum which is thirty feet long. This reduction in physical size reduces problems associated with coating the storage surface as well as problems involving mechanical stability, mechanical tolerancing, and effects of temperature changes. The use of discs results in a memory unit which is lighter, smaller, and less costly than a drum system of the same capacity.

Part of the cost differential between drum and disc memories lies in the number of read-write heads normally required for memories having comparable capacities and access times. Whereas it is extremely inconvenient to physically move heads along the length of the drum and as a consequence at least one head is generally provided for each drum track, it is relatively convenient to move heads from track to track over the surface of a disc and therefore the number of heads provided can be considerably reduced.

In order to move heads over the surface of a disc, at least one positioning means responsive to track address information is provided. A different positioning means could be associated with each disc or one positioning means could be associated with several discs. In either event, each positioning means is adapted to move a bifurcated arm carrying opposed heads which are capable of accessing information from the opposed surfaces of a disc. In order to access information from a selected track, the track is identified by binary information entered into a register and in response thereto the arm is moved relative to the surface of the disc to position the head adjacent the identified track.

In the design of head positioning means, optimization of several different characteristics is important. Initially, it is desirable to be able to move a head from a position adjacent one track to a position adjacent a second track in the shortest possible time. Secondly, it is desirable that the positioning be accurate so as to assure that, regardless of the position from which the head is moved, it will consistently come to rest within a tolerable range. Moreover, it is essential that the head come to rest rapidly because so long as it continues to vibrate, it cannot be used for reading or writing. Thirdly, it is desirable that the positioning means be relatively simple in both mechanical and electrical features so that problems of reliability and maintenance are reduced Fourthly, it is of course extremely important that the head positioning means be as inexpensive as possible.

Two basically different approaches have been utilized to accomplish head positioning. The first approach is to move the heads in a linear manner along a radius of the disc so that the head gaps are always exactly at right angles to the tracks on the disc. The second approach is to mount the heads at the end of long arms mounted for pivotal movement in a plane parallel to the disc. The arms are made sufficiently long so that the arc traced by the heads is as close to a straight line as possible.

It appears clear that the first manner of positioning is preferable from a performance standpoint. However, expensive precision machining is required in the implementation of the first approach and consequently, considerable attention has been paid to the second approach which can be implemented much less expensively and which, if well designed, can avoid excessive operating difficulties which otherwise might arise as a result of the arcuate path traversed by the heads.

In view of the above, it is an object of the present invention to provide an improved positioning means for moving a disc memory head in a linear manner which is both simple in construction and inexpensive and in addition possesses the other desired characteristics, namely speed and accuracy.

The several desired characteristics of head positioning cannot be individually optimized because optimization of one often adversely affects another. For example, in order to reduce the head travel time between tracks, the start-stop head accelerations seemingly have to be increased. However, there is an acceleration limit above which the heads, particularly where they are of the "flying" head type will crash into the disc and thereby be damaged.

Accordingly, it is a further object of the present invention to provide an improved head positioning means which, while providing low head travel times, provides extremely desirable starting and stopping characteristics which obviate the possibility of a head crashing into a disc.

Briefly, the invention is directed to a head positioning means for use in disc memories which provides linear head motion by initially translating binary information into rotary motion and in turn translating said rotary motion into linear motion.

More particularly, in a preferred embodiment of the invention, a bit of a track address is used to selectively position a two position torque motor. A head carrying arm is eccentrically and pivotally coupled to the shaft of the motor. As a result, for each position of the motor, the head is positioned adjacent a different one of two disc tracks. By cascading a plurality of motors and causing each motor to be controlled by a different bit in a track address, a system for positioning a head adjacent one of any number of tracks can be constructed.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURES 3A and 3B respectively are side and top sectional views of a second type of positioning means utilizing cascaded motors;

FIGURE 4 is a sectional view of a different type of cascaded motor positioning means; and FIGURE 5 is a circuit diagram of the electrical means utilized to control the movable mechanical portions of the positioning means.

Figure 1:
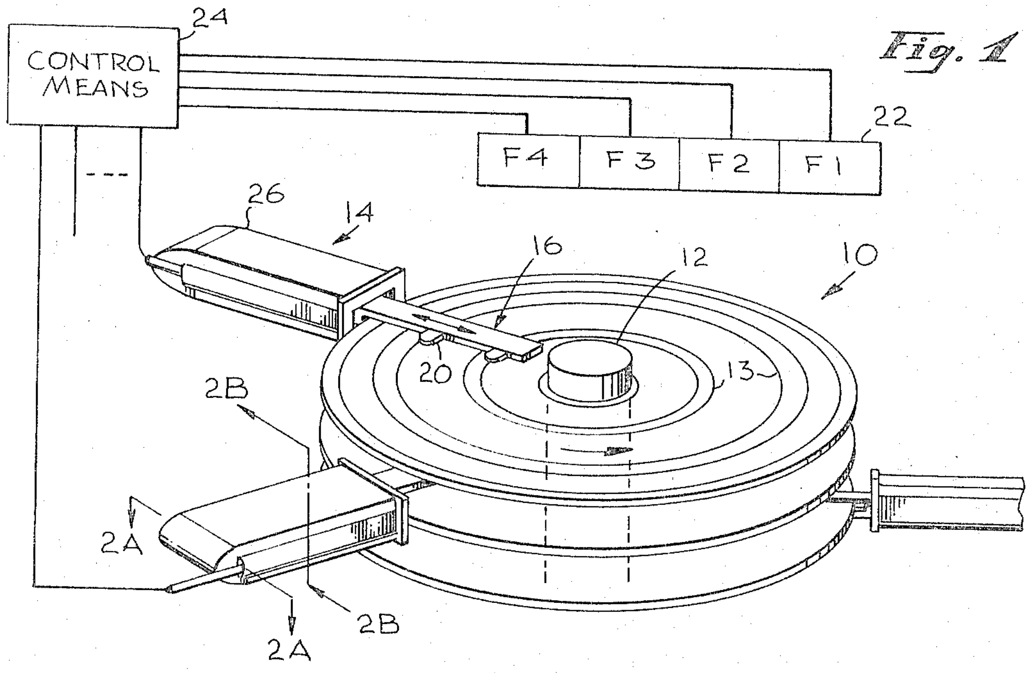
FIGURE 1 is a perspective view of a portion of a disc type digital memory.

Attention is initially called to FIGURE 1 which illustrates a portion of a conventional disc type digital memory. Essentially, the memory includes a stack of discs 10 all mounted on a common shaft 12 so as to be rotated by the shaft in the direction of the arrow. Data is recorded on each of the disc surfaces in each of the illustrated disc tracks 13. Associated with each disc is at least one read-write apparatus 14.

Each read-write apparatus 14 includes a bifurcated arm 16. The bifurcated arm 16 is adapted to move linearly along a radius of a disc 10 in the direction of the arrow. The disc extends between the upper and lower portions of the bifurcated arm 16. Each of the arm portions carries a read-write head 20 which can be conventionally constructed and mounted. Consequently, each read-write head 20 is adapted to access information from a different disc surface.

In order to access information from selected disc tracks, binary information identifying both a disc surface and a track thereon is entered into an address register 22. The address register 22 is connected to a control means 24 which in turn is connected to positioning means 26 which forms part of the read-write apparatus 14. The positioning means 26 selectively moves the bifurcated arm 16 in accordance with the address information in the register 22 to position one of the heads 20 adjacent the disc track to be accessed. As previously noted, it is important that the positioning means 26 very rapidly and accurately move the arm 16 from one position to another.

Figure 2A:
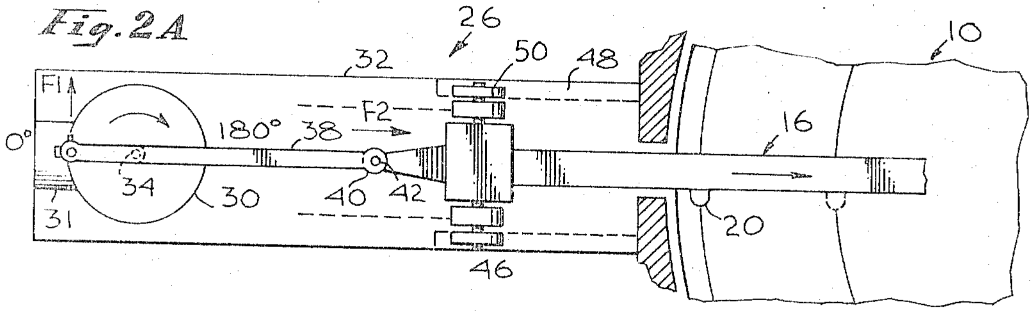
FIGURE 2A is a sectional view of a positioning means constructed in accordance with the present invention taken substantially along the plane 2A—2A of FIGURE 1.
Figure 2B:
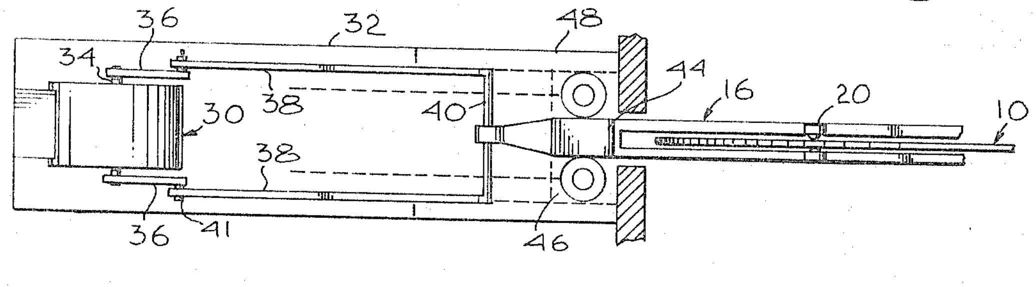
FIGURE 2B is a sectional view taken substantially along the plane 2B—2B of FIGURE 1.

A positioning means 26 in accordance with the invention is illustrated in FIGURES 2A and 2B. Essentially, the positioning means includes a two position torque motor 30 having a mounting plate 31 which is fixedly secured to a housing 32. The motor 30 is provided with a shaft 34 which has a pair of arms 36 perpendicularly secured to the opposite ends thereof. The motor 30 has two stable states so that except during a transition from one state to another, the arms 36 either extend from the shaft to the left (as illustrated in FIGURE 2A), which will be considered as the 0° position, or from the shaft to the right (as illustrated in FIGURE 2B), which will be considered the 180° position.

Pivotally secured to the terminals of the arms 36 is a pair of rods 38 which form part of a U-shaped member including a bight member 40. Bight member 40 extends through a bearing 42 secured to the rear end of arm 16.

The arm 16 is provided with a widened rear portion 44 secured between wheel bearings 46 adapted to roll in tracks 48 formed on the inner surface of the housing 32. The wheel bearings 46 are supported on shaft 50 extending through block 52 secured to the central rear portion of arm 16. Supported in this manner, the arm 16 is restrained from moving in any direction other than linearly with respect to housing 32. As a consequence, of course the only relative movement between the bifurcated arm 16 and the disc 10 is linearly along a radius of the disc.

In the operation of the positioning means of FIGURES 2A and 2B, when the motor 30 is in its stable 0° position, the heads 20 carried by the bifurcated arm 16 is in the solid line position illustrated in FIGURE 2A. When the motor 30 is energized so as to move to its stable 180° position, the heads 20 move to the dotted line position adjacent a second track.

Several characteristics of the operation of the positioning means thus far described are particularly significant and desirable for controlling a bifurcated arm in the disc memory environment contemplated. More particularly, note that when the circular motion of the shaft 34 starts, e.g. from the 0° position, the force F2 (FIGURE 2A) along the radius of the disc is zero and the speed of the head 20 is also zero. This starting condition is desirable inasmuch as it avoids excessively high acceleration which can be damaging to the head, particularly where the head is of the so-called "flying" type. Excessively high acceleration can cause "flying" heads to crash into the disc.

As the shaft 34 begins to rotate, the force component F2 increases and the speed of movement of the head 20 also increases until the eccentric has reached the 90° point, that is the point midway between the two stable conditions. At this point, the linear speed of the head has reached a maximum and subsequently decelerates to a speed of zero at the 180° position. Additionally, the braking torque increases to infinity at the 180° position since any inertia remaining in the head produces a force of F2 which has a zero force component in the direction of F1. Consequently, the illustrated positioning means has several attributes particularly suitable for positioning a head relative to a disc.

Succinctly stated, these advantages are that the head can be moved rapidly inasmuch as the motor 30 has a starting load of zero thereby giving it a maximum starting torque. Similarly, it can stop the head movement very rapidly since the linear force on the head at stopping is zero thereby providing maxiumm braking torque. Because slight angular tolerances at the two stable positionings of the motor do not significantly effect the position of the head, accurate positioning of the head is assured with little resulting vibration. Since the only factor limiting access time is the torque of the motor, extremely fast access times can be achieved. A further significant aspect of the illustrated construction is that the stopping positions of the head can be very finely adjusted by simply adjusting the eccentricity or effective length of the rods 38 coupled to the arm carrying head.

The effective length of rods 38 can be adjusted by providing cylindrical collars 39 mounted on the arms 36 for rotational movement about their axes. The rods 38 can be slidably received through apertures extending through the collars 39 perpendicularly to their axes. Screw 41 can be used to prevent slidable movement between rods 38 and collars 39. Further, the technique lends itself well to cascading motors to thereby enable one of several different tracks to be selected. Significantly, where several motors are cascaded, the head travel time from one track to another will remain substantially constant regardless of the distance the head must travel since all of the cascaded motors can be simultaneously energized in a manner to be described.

Whereas the positioning means of FIGURES 2A and 2B are capable of moving the heads 20 adjacent either one of two possible tracks, the positioning means of FIGURES 3A and 3B illustrates how two motors can be cascaded to thereby permit the heads 20 to be selectively moved adjacent one of four tracks. In FIGURES 3A and 3B, the bifurcated arm 16 can be coupled to motor 30 in the identical manner as previously described. However, the difference between the embodiment of FIGURES 3A and 3B and the embodiment of FIGURES 2A and 2B lies in the manner in which the motor 30 is mounted. Whereas in FIGURES 2A and 2B, the motor 30 was fixedly secured to the housing 32, the motor 30 of FIGURES 3A and 3B has a collar 60 secured thereto which carries a plurality of ball-bearings 62 received in tracks 64 formed on the inner surface of housing 32. In addtion, a shank 66 is secured to the motor mounting plate 31. The shank 66 is provided with a bearing 68 on the end thereof remote from the mounting plate 31. The bearing 68 rotatably receives bight member 72 therethrough. Bight member 72 forms part of a U-shaped member including rods 74. The terminal portions of the rod 74 are pivotally secured to arms 76 perpendicularly extending from the ends of shaft 78 of motor 80. The motor 80 is provided with a mounting plate 82 which is fixedly secured to the housing 32.

By cascading the motors 80 and 30 as shown in FIGURES 3A and 3B, the heads 20 can be selectively moved to any one of four positions on the disc 10 if the arms 36 and 76 are of different lengths. Assume that arms 36 are of one unit length and arms 76 are of two unit lengths.

More particularly, it will be recalled that an address register 22 is provided for storing a binary address identifying a disc and a track to be selected. Let it be assumed that the register 22 consists of four stages each comprising a flip-flop. Let it further be assumed that flip-flops F3 and F4 identify a particular disc surface and consequently a particular head positioning means 26, it being assumed for purposes of clarity herein that a 1:1 correspondence exists between the number of positioning means provided and the number of discs employed. Flip-flops F1 and F2 can be utilized to identify a particular track on the disc surface identified by flip-flops F3 and F4. Flip-flop F1 can be connected to control motor 30 and flip-flop F2 can be connected to control motor 80. Assume that a binary "0" stored in a flip-flop causes the motor connected thereto to be driven to a 0° position, and a binary "1" stored in a flip-flop causes the motor connected thereto to be driven to a 180° position. Consequently, it should be apparent that any one of the illustrated four disc tracks (FIGURE 3B) can be selected by properly entering information into flip-flops F1 and F2.

More particularly, let it be assumed that the flip-flops F1 and F2 both store a binary "0." Consequently, the head 20 will be positioned adjacent track zero. If the contents of flip-flop F1 were then switched to a binary "1," the heads 20 would be moved one unit length to the right to thereby be adjacent to track one. On the other hand, if flip-flop F1 were to retain its binary "0" content and if the content of flip-flop F2 were to switch to binary "1," the heads 20 would move two unit lengths to a position adjacent to track two. It should be recalled that the lengths of arms 76 are twice that of arms 36. In other words, the degree of eccentricity of the shaft 78 and rod 74 coupling is twice that of the degree of eccentricity between the rods 38 and shaft 34. When both flip-flops F1 and F2 store a binary "1," the bifurcated arm 16 is of course moved three unit lengths to the right thereby positioning the heads 20 adjacent track three.

FIGURE 4 illustrates a further embodiment of a two motor positioning system. Instead of disposing the motors in alignment as shown in FIGURES 3A and 3B, the motor 80 can be secured to a wall 90 below the housing 32. The motor 30 can be mounted in the same manner as in FIGURES 3A and 3B. In lieu of coupling the U-shaped member including the rods 74 and bight member 72 directly to the shank 66 however, the rods 74 are provided with centrally positioned bearings 94 adapted to rotate on a fixed shaft 92. Additionally, the ends of rods 74 are provided with slots 96 through which extend pins coupling the rods to the motor 80. As a consequence, when the motor 80 is in its 180° position, the rods 74 will be in the solid line positions illustrated while when the motor 80 is in its 0° position, the rods 74 will assume the dotted line position illustrated. However, it should be realized that the movement of the motor 30 will be the same in FIGURE 4, as it was in FIGURES 3A and 3B.

Any of several different types of motor arrangements can be suitably utilized in each of the above-described positioning means embodiments. One such motor arrangement is illustrated in FIGURE 5 which also shows the manner in which a flip-flop can be utilized to control the position thereof. The rotor 100 of the motor carries a pair of field producing elements which for simplicity, will be assumed to be permanent magnets having the polarities illustrated. A stator positioned around the rotor is provided with four pole pieces 102, 104, 106, and 108 wound as illustrated. The windings on pole pieces 102 and 106 are connected in series across the two output terminals of a flip-flop. The pole pieces 102 and 106 are utilized to establish a main driving field while the pole pieces 104 and 108 are utilized to establish an auxiliary field.

In a first state of the flip-flop 110, the output terminal 112 will have a potential of +V while the output terminal 114 will have a potential of −V. In a second state, the output terminal 112 will have a potential of −V and the output terminal 114 will have a potential of +V. With the winding arrangement illustrated, when the flip-flop is in a second state, the rotor 100 will move to the position illustrated. When the flip-flop is in a first state, the rotor 100 will rotate by 180°.

In order to assure rapid rotation of the rotor and to prevent a balanced condition which would inhibit its motion, means are provided for initially producing an auxiliary field by utilizing pole pieces 104 and 108 in response to a change of state by the flip-flop. For this purpose, a transformer 118 is provided having a center tapped primary coil 120 and a secondary coil 122. The terminals of the primary coil 120 are connected through diodes 124 to the output terminals 112 and 114 of the flip-flop. The terminals of the secondary coil 122 are connected to the input of a monostable multivibrator 126 whose output is connected to ground through a series circuit including the windings on pole pieces 104 and 108. In one state of the multivibrator 126, its output will be at +V while in a second state its output will be at ground. In response to a change of state of the flip-flop 110, a pulse will be induced in the primary 120 of transformer 118 which will in turn induce a pulse in the secondary 122 thereof. Consequently, the output of the monostable multi-vibrator 126 will increase to +V for a very short time before going back to its stable state thereby initiating a current through the windings on pole pieces 104 and 108. As a consequence an auxiliary field is produced which prevents an unbalanced condition and which in addition increases the initial torque of the motor to thereby make the movement of the arm 16 more rapid.

From the foregoing, it should be appreciated that an improved head positioning means particularly useful in conjunction with disc type digital memories has been provided. The improved means are characterized by their extreme simplicity of construction which consequently tends to make it reliable and relatively inexpensive. Moreover, it has been shown that by transforming binary information into rotary motion prior to transformation into linear motion, particularly desirable starting speed and torque characteristics are achieved which result in accurate positioning and rapid access without resulting damage to the head or disc surface. The invention has been described only in conjunction with bistable motors but however it should be apparent that the teachings can be extended to systems using motors having more than two stable positions, although it will be appreciated that such systems will not retain the particularly attractive starting characteristics possessed by the bistable motor systems, nor reduce vibration significantly in coming to rest.

What is claimed is:

1. A record medium, means for selectively positioning a medium head adjacent any one of a plurality of tracks upon said record, said means comprising a bistable device including a member mounted for rotational movement about a first axis; said bistable device including means responsive to the application of a stimulus thereto for rotating said member to either one of two positions to position said head at one of the said plurality of tracks and responsive to the absence of the application of said stimulus thereto for preventing rotation of said member; a rod having first and second ends; means pivotally securing said first end of said rod to said member eccentrically with respect to said first axis; an arm having first and second ends; means pivotally attaching said second rod end to said first arm end; bearing means enclosing a portion of said arm for restraining said arm to linear movement in a direction perpendicular to said first axis; said head supported on the second end of said arm.

2. A record medium, means for selectively positioning a head adjacent any one of a plurality of tracks upon said record medium, said means comprising a multistable device including a member mounted for rotational movement about a first axis; said multistable device including means responsive to the application of a stimulus thereto for rotating said member to one of a multiple of stable positions to position said head at one of the said plurality of tracks and responsive to the absence of the application of said stimulus thereto for preventing rotation of said member; a rod having first and second ends; means pivotally securing said first end of said rod to said member eccentrically with respect to said first axis; an arm having first and second ends; means pivotally attaching said second rod end to said first arm end; bearing means enclosing a portion of said arm for restraining said arm to linear movement in a direction perpendicular to said first axis; said head supported on the second end of said arm.

3. For use in combination with a disc having a plurality of tracks thereon, positioning means for positioning a head adjacent the one of said tracks identified by a binary address stored in a multistage track register, said positioning means comprising a plurality of bistable devices each including a member mounted for rotational movement; means coupling each of said track register stages to a different one of said bistable devices for causing each of said members to assume a first stable position in response to a stored binary "1" and a second stable position in response to a stored binary "0"; a plurality of rods each having first and second ends; means pivotally and eccentrically securing each of said rod first ends to a different one of said members; a plurality of arms each having first and second ends; means pivotally attaching each of said second rod ends to a different one of said first arm ends; said head supported on the second end of one of said arms; and bearing means enclosing a portion of said head supporting arm for restraining movement thereof to a direction along a radius of said disc.

4. For use in combination with a disc having a plurality of tracks thereon, positioning means for positioning a head adjacent the one of said tracks identified by a binary address stored in a multistage track register, said positioning means comprising a plurality of bistable devices each including a member mounted for rotational movement; means coupling each of said track register stages to a different one of said bistable devices for causing each of said members to assume a first stable position in response to a stored binary "1" and a second stable position in response to a stored binary "0"; a plurality of rods each having first and second ends; means pivotally and eccentrically securing each of said rod first ends to a different one of said members; a plurality of arms each having first and second ends; means pivotally attaching each of said second rod ends to a different one of said first arm ends; means supporting said head on the second end of one of said arms; means connecting the second end of each of said other arms to a different one of said bistable devices; bearing means enclosing a portion of said head supporting arm for restraining movement thereof to a direction along a radius of said disc; and bearing means enclosing each of said bistable devices for restraining movement thereof.

5. The positioning means of claim 4 wherein the degree of eccentricity between the rod and member in each bistable device is weighted according to the significance of the track register stage coupled thereto.

6. In a digital memory including at least one storage disc having $2^n$ tracks per head, positioning means for positioning said head adjacent the one of said $2^n$ tracks identified by a binary address stored in an $n$ stage track register, said positioning means comprising $n$ bistable devices each including a member mounted for rotational movement; means coupling each of said $n$ track register stages to a different one of said $n$ bistable devices for causing each of said members to assume a first stable position in response to a stored binary "1" and a second stable position in response to a stored binary "0"; $n$ rods each having first and second ends; means pivotally and eccentrically securing each of said rod first ends to a different one of said members; $n$ arms each having first and second ends; means pivotally attaching each of said second rod ends to a different one of said first arm ends; said head support on the second end of one of said arms; and bearing means enclosing a portion of said head supporting arm for restraining movement thereof to a direction along a radius of said disc.

7. The positioning means of claim 6 wherein the degree of eccentricity between the rod and member in each bistable device is weighted according to the significance of the track resister stage coupled thereto.

8. The positioning means of claim 6 wherein each of said bistable devices includes first means carried by said member for producing a first magnetic field and second means disposed proximate to said first means for producing a second magnetic field adapted to interact with said first magnetic field; and means for energizing each of said second means in a first direction in response to a binary "1" stored in the track register stage associated therewith and in a second direction in response to a binary "0" stored in the track register stage associated therewith.

9. The positioning means of claim 8 wherein each of said bistable devices includes auxiliary field producing means and means for energizing said auxiliary field producing means in response to state changes of said track register stages.

References Cited by the Examiner

UNITED STATES PATENTS

| | | | |
|---|---|---|---|
| 2,832,840 | 4/1958 | Morin | 340—174.1 |
| 2,929,253 | 3/1960 | Baldelli | 74—44 |
| 3,130,331 | 4/1964 | Jallen et al. | 340—174.1 |

BERNARD KONICK, *Primary Examiner.*

A. I. NEUSTADT, *Assistant Examiner.*